United States Patent
Sandre

(10) Patent No.: US 6,512,929 B1
(45) Date of Patent: Jan. 28, 2003

(54) TELECOMMUNICATION ASSEMBLY

(75) Inventor: Benoît Sandre, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/318,324

(22) Filed: May 25, 1999

(30) Foreign Application Priority Data

May 29, 1998 (FR) .............................................. 98 06826

(51) Int. Cl.$^7$ .............................. H04B 7/00; H04M 11/00
(52) U.S. Cl. ...................... 455/512; 455/66; 379/93.02; 379/106.08
(58) Field of Search ............................... 370/414, 416, 370/418, 444, 455, 528, 328, 463, 468, 461, 462; 379/156.03, 106.02, 208.01, 93.02, 93.03; 340/870.02, 870.03, 870.07, 825.5; 455/512, 527, 517, 516, 528, 66, 509, 462, 463, 464, 414

(56) References Cited

U.S. PATENT DOCUMENTS

| | | | | |
|---|---|---|---|---|
| 4,031,330 A | * | 6/1977 | van Leeuwen ............... 370/337 |
| 5,003,581 A | * | 3/1991 | Pittard ..................... 379/93.09 |
| 5,519,763 A | | 5/1996 | Namekawa et al. .......... 379/61 |
| 5,678,188 A | * | 10/1997 | Hisamura ................... 455/509 |
| 5,689,803 A | * | 11/1997 | Tayloe ..................... 379/209.01 |
| 5,734,867 A | * | 3/1998 | Clanton et al. ............. 370/337 |
| 5,748,104 A | * | 5/1998 | Argyroudis et al. ... 340/870.11 |
| 5,787,162 A | * | 7/1998 | Javitt ......................... 370/259 |
| 5,812,656 A | * | 9/1998 | Garland et al. ............. 379/208 |
| 5,914,672 A | * | 6/1999 | Glorioso et al ........ 340/870.02 |
| 6,067,457 A | * | 5/2000 | Erickson et al. ............ 455/512 |
| 6,073,169 A | * | 6/2000 | Shuey et al. ................ 709/217 |
| 6,137,423 A | * | 10/2000 | Glorioso et al. ....... 340/870.02 |

FOREIGN PATENT DOCUMENTS

JP        403034644 A    *   2/1991

* cited by examiner

Primary Examiner—Charles N. Appiah
(74) Attorney, Agent, or Firm—Dicran Halajian

(57) ABSTRACT

A telecommunication assembly includes various terminals which share a transmission channel via a base station for granting or not granting a terminal access to the transmission channel on the basis of different priorities being assigned to the terminals. The base station includes communication-and-control circuitry for providing a communication channel between the base station and each terminal irrespective of whether a high-priority terminal has been granted access to the transmission channel. This allows a user of a low-priority terminal to be informed that he or she cannot make use of the telephone line for reasons of priority. Once the telephone line is free, the base station may signal this to the low-priority terminal which has been denied access to the telephone line. An internal communication between two different low-priority terminals can be effected while a high-priority terminal uses the telephone line.

18 Claims, 1 Drawing Sheet

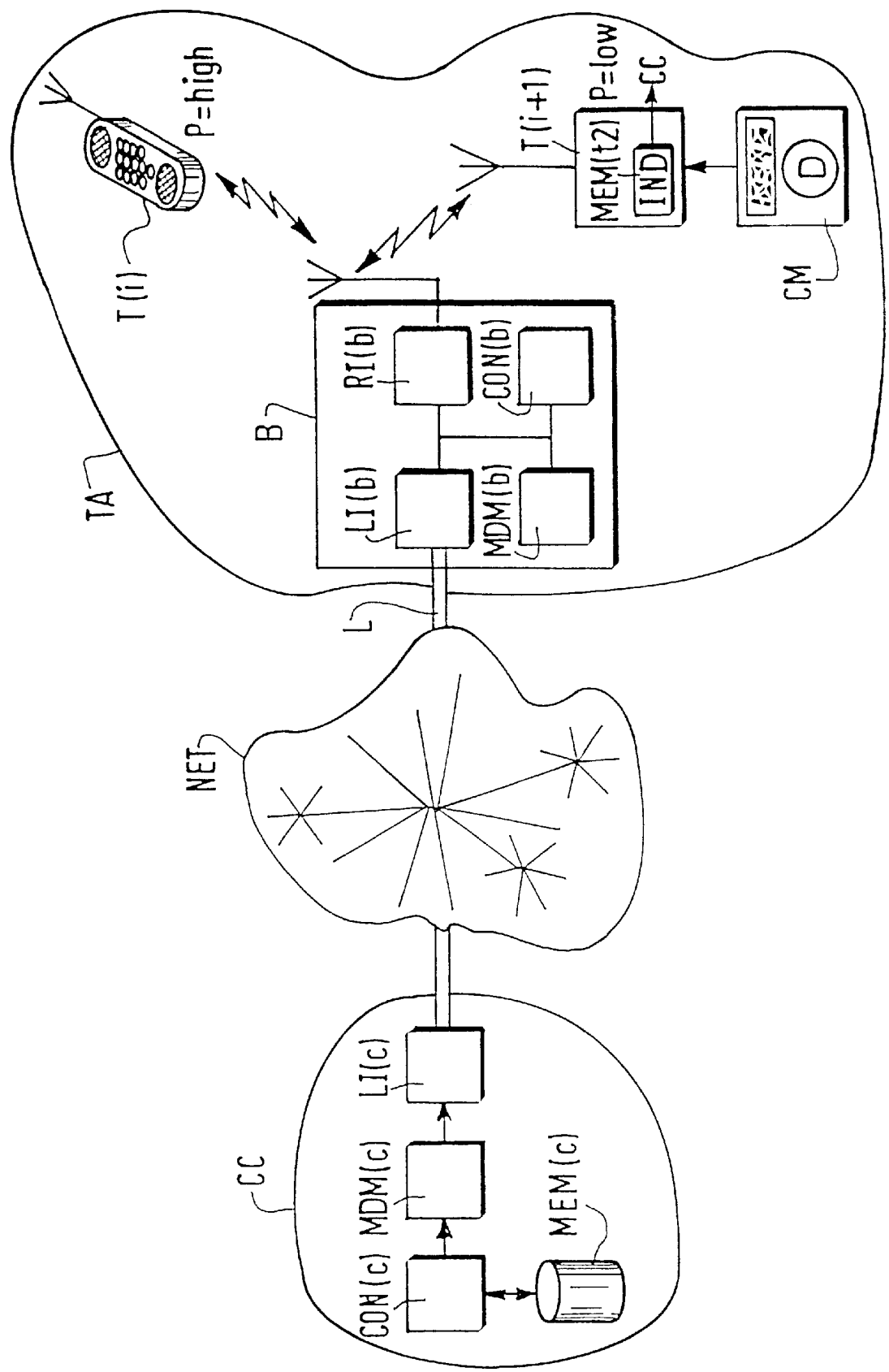

TELECOMMUNICATION ASSEMBLY

FIELD OF THE INVENTION

The invention relates to a telecommunication assembly comprising various terminals that share a transmission channel via a base station. The transmission channel may be, for example, a telephone line which forms part of a telephone network.

BACKGROUND OF THE INVENTION

U.S. Pat. No. 5,070,523 describes an exchange which interfaces a two-wire public telephone line to two standard telephones and four auto-dial/auto-answer modem devices. The telephone handset on port number one has been selected for priority of use over the remaining ports in that if the telephone handset goes off-hook, any auto-dial/auto-answer modem-equipped device that is connected to the exchange will be disconnected.

SUMMARY OF THE INVENTION

It is an object of the invention to provide a telecommunication assembly as mentioned above which allows greater user satisfaction.

The invention takes the following aspects into consideration. Let it be assumed that a low-priority terminal wants to use the telephone line while a high-priority terminal is using the telephone line. In the background art, a low-priority terminal is disconnected from the base station when a high-priority terminal is using the line. Consequently, to a user of the low priority terminal, it seems as if the telephone line is dead or as if a plug has been pulled out. The user of the low-priority terminal has, in principle, no knowledge whatsoever concerning the reason for which he or she cannot make use of the telephone line. This can annoy the user.

An other aspect which can annoy a user is the following. Let it be assumed that a high-priority terminal requests access to the telephone line while two low-priority terminals are communicating with each other, that is, while an internal communication is taking place. In the background art, the low-priority terminals will be disconnected from the base station and, consequently, the internal communication will be cut off. This will annoy the users who were internally communicating via the two low-priority terminals. In addition, users will generally be annoyed if they can not establish an internal communication because a high priority terminal is effecting an external communication via the telephone line.

According to the invention the base station comprises communication-and-control circuitry for providing a communication channel between the base station and each terminal irrespective of whether a high-priority terminal has been granted access to the transmission channel. This allows a low-priority terminal to receive a message from the base station telling the low-priority terminal that it can not use the telephone line for reasons of priority. The message may optionally include an identification of the high-priority terminal which is using the telephone line. Accordingly, a user of the low-priority terminal can be informed about who or what is preventing him or her from effecting an external communication. In addition, once the high-priority terminal has ended its use of the telephone line, the base station may signal this to a low-priority terminal which has been denied access to the telephone line. Accordingly, the user of this low-priority terminal is informed that he or she can effect an external communication. Since, in the invention, the base station maintains a communication channel with each terminal, this allows an internal communication between two different low-priority terminals while a high-priority terminal uses the telephone line. Any of these aspects makes that the invention allows greater user satisfaction.

BRIEF DESCRIPTION OF THE DRAWINGS

These and other aspects of the invention are apparent from and will be elucidated, by way of non-limitative example, with reference to the embodiments described hereinafter.

In the drawings:

FIG. 1 is a block diagram illustrating an example of a telecommunication assembly according to the invention.

DETAILED DESCRIPTION OF THE INVENTION

The following remarks relate to reference signs. Similar entities are designated by a reference with similar letters in all the Figures. Several similar entities may appear in a single Figure. In that case, a digit or a suffix is added to the letter reference so as to distinguish between similar entities. The digit or the suffix may be omitted for convenience. This applies to the description and also to the claims.

FIG. 1 illustrates an example of a wireless telephone set TA according to the invention. It is assumed that the wireless telephone set TA operates in accordance with the Digital European Cordless Telephone (DECT) standard. The wireless telephone set TA comprises a base station B and several terminals T. The base station B comprises a controller CON[b], a modem MDM[b], a line interface LI[b], and a radio interface RI[b]. The base station B is connected to a telephone network NET via a telephone line L. A single telephone number is assigned to the wireless telephone set TA. FIG. 1 further illustrates a remote-reading center CC which is also coupled to the telephone network NET. The remote-reading center CC comprises a memory MEM[c], a controller CON[c], a modem MDM[c], and a line interface LI[c].

More specifically, the wireless telephone set TA comprises a telephone terminal T[i] for transmitting the human voice. The wireless telephone set TA may comprise further telephone terminals which are not shown in FIG. 1. The wireless telephone set TA further comprises a remote-reading interface T[i+1]. The remote-reading interface T[i+1] includes a memory MEM[t2] in which an identification IND of the remote-reading center CC is stored.

The remote-reading interface T[i+1] is coupled to a consumption meter CM for measuring the electricity consumption for example.

The wireless telephone set TA basically operates as follows. The base station B maintains a radio communication channel with each terminal T by means of the controller CON[b] and the radio interface RI[b]. To that end, the base station B regularly sends messages to the terminals T. These messages indicate, amongst other things, which time slots are available for conveying messages to the base station B. Thus, a terminal T may send a message to the base station B in a time slot which is free. This applies irrespective of whether the base station B has granted an other terminal access to the telephone line L. Thus, if the telephone terminal T[i] has access to telephone line L via the base station B, this does not prevent an exchange of messages between the base station B and the remote-reading interface T[i+1] for example.

In the base station B, the line interface LI[b] carries out the processes necessary for transmitting and receiving signals through the telephone line L. The radio interface RI[b] carries out the processes necessary for transmitting and receiving signals through the radio channel between the terminals T and the base station B. The modem MDM[b] transforms data received from the remote-reading interface T[i+1] for example, so as to transfer them over the telephone network NET.

The controller CON[b] of the base station B controls all internal and external communications of the wireless telephone set TA. An internal communication is a communication between two different terminals T of the wireless telephone set TA. An external communication is a communication between a terminal T of the wireless telephone set TA and a terminal which does not belong to the wireless telephone set TA via the telephone network NET. The controller CON[b] assigns a level of priority for external communications to each terminal T. The telephone terminal T[i] has been assigned a high level of priority P=high, whereas the remote-reading interface T[i+1] has been assigned a low level priority P=low. The level of priority is preferably expressed by a value. For example, the value 1 may correspond to the highest priority whereas the value 7 may correspond to the lowest priority.

The following is an example of an operation of the wireless telephone set TA in which priority plays a role. Let it be assumed that the remote-reading center CC finds that it is time to read the consumption meter CM. Such a finding may be made automatically, for example, by storing in the memory MEM[c] the latest date at which the consumption meter CM has been read out. This enables the controller CON[c] to periodically verify whether or not the consumption meter CM has been read out for a predefined previous period. If not, the controller CON[c] dials the telephone number assigned to the wireless telephone set TA to which the consumption meter CM is connected. Worded differently, the remote-reading center CC calls the wireless telephone set TA to effect a new reading.

The base station B of the wireless telephone set TA receives the call from the remote-reading center CC and transmits this call to the remote-reading interface T[i+1]. Preferably, the telephone network NET transmits the telephone number of the called party.

The remote-reading interface T[i+1] verifies this number with each call by using the identification IND stored in the memory MEM[t2]. Thus, the remote-reading interface T[i+1] can recognize that it is a call coming from the remote-reading center CC. After having recognized the call from the remote-reading center CC, the remote-reading interface T[i+1] takes the call and starts transferring the data D required by the remote-reading center CC.

Thus, the reading of the consumption meter CM is effected. Preferably, the remote-reading interface T[i+1] takes the call before the telephone terminal T[i] starts ringing, so as to avoid a user of the telephone terminal T[i] taking the line by pressing key or lifting a horn for example.

It is supposed that a user makes a telephone call while the consumption meter CM is being read out. The user depresses a "line access" key that is present on the telephone terminal T[i]. In response, the telephone terminal T[i] generates a request to take the telephone line and transfers this request to the base station B. In the base station B, the controller CON[b] recognizes the request for taking the line. Since the telephone terminal T[i] has a higher priority than the remote-reading interface T[i+1], the controller CON[b] cuts off the transfer of data D under way. That is, the controller CON[b] cuts off the reading of the consumption meter CM by going on-hook. The base station B signals to the remote-reading interface T[i+1] that the reading of the consumption meter CM has been cut off.

After going on-hook, which marks the cutting off of the reading of the consumption meter CM, the controller CON [b] immediately takes the telephone line L to the off-hook mode. This again brings the base station B into contact with the telephone line L. The base station B signals to the telephone terminal T[i] that the telephone line L is free and ready to use. Thus, the user can make his telephone call. At the end of this call, the user will put the telephone terminal T[i] in the on-hook mode, for example, by again depressing the key "line access".

The telephone terminal T[i] signals to the base station B this on-hook condition, which marks the end of the telephone call of the user. Then, the base station B signals to the remote-reading interface T[i+1] that the call that has caused the reading of the consumption meter CM to be cut off is terminated. This implies that the telephone line L is free. The remote-reading interface T[i+1] may possibly call back the remote-reading center CC to complete or restart the transfer of data D. The remote-reading interface T[i+1] may also wait for the remote-reading center to call back.

Let is now be assumed that the telephone set TA comprises a further terminal, which is not shown in FIG. 1, and that this terminal has an intermediate priority. The terminal will hereinafter be referred to as the intermediate priority terminal. If the intermediate priority terminal generates a request to take the telephone line while a reading of the consumption meter CM takes place, the reading will be stopped so as to grant the intermediate priority terminal access to the telephone line. However, if the intermediate priority terminal generates a request to take the telephone line while the telephone terminal T[i] is making an external communication, the request will not be granted. In that case, the base station B may signal to the intermediate priority terminal that the request has been refused because a higher priority terminal is effecting an external communication. The base station may even specify that it is telephone terminal T[i] which is occupying the telephone line L. In addition, base station B may memorize the request made by the intermediate priority terminal and, once telephone terminal T[i] has ended the external communication, signal to the intermediate priority terminal that the telephone line is free for making a call. It should be noted that the intermediate priority terminal may be, for example, a telephone for the transmitting the human voice, a facsimile machine, or a personal computer equipped with modem.

The Figures and their description above illustrate the invention rather than limit same. It is evident that there are many alternatives that remain within the scope of the appended claims. Therefore, several remarks are made in conclusion.

The functional entities or functions may be spread out in various different ways. For this purpose, it should be observed that the Figures are highly diagrammatic, each Figure representing only a single embodiment of the invention. Thus, although a Figure shows functional entities in separate blocks, this does not exclude at all that various functional entities are present in a single physical entity.

Any reference sign in a claim should not be construed as limiting the claim.

What is claimed is:

1. A telecommunication assembly which comprises various terminals sharing a transmission channel via a base station for granting or not granting a terminal access to the transmission channel based of different priorities being assigned to the terminals, wherein the base station comprises communication-and-control circuitry for providing a communication channel between the base station and each terminal irrespective of whether a high-priority terminal has been granted access to the transmission channel, wherein a low priority terminal has a memory that stores an identification of a calling party, said low priority terminal answering a call from said calling party before said high priority terminal starts indicating that a call is received.

2. A telecommunication assembly as claimed in claim 1, wherein said low-priority terminal is arranged for again contacting said calling party using the stored identification when a communication between the two terminals has been cut off.

3. A telecommunication assembly as claimed in claim 1, wherein said low-priority terminal is a remote-reading interface coupled to a consumption meter for transferring consumption data to a remote-reading center via a telephone network.

4. A communication system comprising:
 a base station which communicates with a network through a transmission channel; and
 a high priority terminal and a low priority terminal which communicate with said base station for gaining access to said transmission channel;
 wherein said base station is connected with said high priority terminal and said low priority terminal by a communication channel even when said base station has provided access of said transmission channel to said high priority terminal; and
 wherein said low priority terminal has a memory that stores an identification of a calling party, said low priority terminal answering a call from said calling party before said high priority terminal starts indicating that a call is received.

5. The communication system of claim 4, wherein said base station interrupts access of said low priority terminal to said transmission channel when said high priority terminal requests access to said transmission channel.

6. The communication system of claim 4 wherein, in response to a request for access to said transmission channel by said low priority terminal, said base station denies access of said low priority terminal to said transmission channel when said high priority terminal is accessing said transmission channel.

7. The communication system of claim 6, wherein said request for access to said transmission channel by said low priority terminal is provided over said communication channel.

8. The communication system of claim 6, wherein said base station notifies said low priority terminal via said communication channel when said transmission channel becomes available.

9. The communication system of claim 4, wherein said base station prevents access of said low priority terminal to said transmission channel when said high priority terminal is accessing said transmission channel.

10. The communication system of claim 9, wherein said base station notifies said low priority terminal via said communication channel when said transmission channel becomes available.

11. The communication system of claim 4 wherein, when said base station denies said low priority terminal access to said transmission channel, said base station providing to said low priority terminal a message that includes at least one of a reason for denial of said access and an identification of a terminal that is accessing said transmission channel.

12. The communication system of claim 11, wherein said base station provides said message using said communication channel.

13. The communication system of claim 4, wherein said calling party is a remote reading center and said low priority terminal includes a remote reading interface.

14. A communication system of comprising:
 a base station which communicates with a network through a transmission channel; and
 a high priority terminal and a low priority terminal which communicate with said base station for gaining access to said transmission channel;
 wherein said base station is connected with said high priority terminal and said low priority terminal by a communication channel even when said base station has provided access of said transmission channel to said high priority terminal; and
 wherein said low priority terminal has a memory that stores an identification of a calling party, said low priority terminal calling back said calling party using said identification after said base station interrupts a call of said calling party in response to said high priority terminal requesting access of said transmission channel and notifies said low priority terminal of access availability to said transmission channel.

15. A communication system of comprising:
 a base station which communicates with a network through a transmission channel; and
 a high priority terminal and a low priority terminal which communicate with said base station for gaining access to said transmission channel;
 wherein said base station is connected with said high priority terminal and said low priority terminal by a communication channel even when said base station has provided access of said transmission channel to said high priority terminal; and
 wherein said low priority terminal has a memory that stores an identification of a calling party, said low priority terminal answering a call from said calling party before said high priority terminal starts indicating that a call is received in order to prevent a user of said high priority terminal from answering said call.

16. A communication system comprising:
 a base station which communicates with a network through a transmission channel; and
 a high priority terminal and a low priority terminal which communicate with said base station for gaining access to said transmission channel;
 wherein said base station maintains a communication channel with said high priority terminal and said low priority terminal irrespective of whether said base station provides access to said transmission channel to one of said high priority terminal and said low priority terminal; and
 wherein said low priority terminal has a memory that stores an identification of a calling party, said low priority terminal answering a call from said calling party before said high priority terminal starts indicating that a call is received.

17. The communication system of claim 16, wherein said calling party is a remote reading center and said low priority terminal includes a remote reading interface.

18. The communication system of claim 16, wherein said base station regularly sends messages using said communication channel to said high priority terminal and said low priority terminal even when one of said high priority terminal and said low priority terminal is accessing said transmission channel.

* * * * *